United States Patent
Pauliukonis

[15] 3,666,230
[45] May 30, 1972

[54] ELASTOMATIC VALVE

[72] Inventor: Richard S. Pauliukonis, 6660 Greenbrier Dr., Parma Heights, Ohio 44730

[22] Filed: Aug. 3, 1970

[21] Appl. No.: 60,238

[52] U.S. Cl. .................................. 251/63.5, 251/331
[51] Int. Cl. ............................................. F16k 7/12
[58] Field of Search ............................ 251/331, 63.5

[56] References Cited

UNITED STATES PATENTS

| 3,412,974 | 11/1968 | Harris | 251/331 |
| 3,451,423 | 6/1969 | Priese | 251/331 X |

FOREIGN PATENTS OR APPLICATIONS

| 622,204 | 4/1949 | Great Britain | 251/331 |
| 269,279 | 10/1950 | France | 251/331 |
| 633,144 | 10/1927 | France | 251/331 |
| 1,016,054 | 8/1952 | France | 251/331 |

Primary Examiner—Arnold Rosenthal

[57] ABSTRACT

A membrane operated normally closed or normally open two-way valve including a valve plug adjustable from a closed first position blocking communication from an inlet port to a discharge port, or vice-versa, by a manually adjustable screw acting on a valve plug in contact with one side of such membrane and working against the forces of a fluid on the other side of this membrane to either block the fluid communication between the inlet and discharge ports or to permit such communication when the screw is withdrawn, or by a pilot operator, the piston of such pilot operator replacing the screw and working against the plug when energized by either air or hydraulic fluid pressure in the pilot, so constructed that the piston area of the pilot side is larger than the membrane area under the plug and on the other side of the membrane resulting in a mechanical advantage in which the piston pilot pressure can be lower than the pressure of the fluid valved.

1 Claims, 2 Drawing Figures

PATENTED MAY 30 1972

3,666,230

INVENTOR.

Richard S. PAULIUKONIS

ELASTOMATIC VALVE

This invention relates to special valves for handling either chemicals such as solvents or solutions used in Chemical, Pharmaceutical, Cosmetic, Food and Drug Industries or Industrial Mixtures including suspensions or slurries, and more specifically to a simplified valve design designated for a special purpose requiring the use of special materials for valve construction, such materials being compatible with the working fluid handled to insure long service life of such valve, and more important such valves being competitive price-wise.

Present valves for handling chemicals, slurries or suspensions employ either complicated sleeve and core designs, collapsible sleeve or pinch valve principles, all of which are either too complicated, too costly, or fail prematurely.

The general object of this invention is to provide a membrane operated valve of an advanced design in which such membrane, being compatible with fluids valved, acts as a flow restrictor, or a stopper, for a flowthrough of the fluid inside a valve body which is made also from the material that is compatible with such fluids.

Further object of this invention is to incorporate into the valve body a straight through-flow passage means, such passage means yielding the very minimum resistance to the fluid flow to insure highest possible flow capacity and minimum pressure drop.

Further object is to provide simple flow control capability within such simple to operate, maintain& service, and economically priced valves.

Other objects and advantages of this invention will be apparent from the ensuing disclosure and the appendent claims.

In the drawings

FIG. 1 illustrates the general arrangement of valve components in a normally closed condition of the valve.

Figure 1:
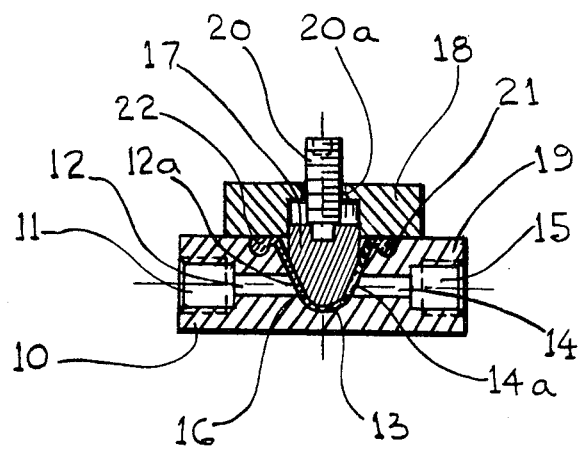
FIG. 1 is a sectional view of a membrane valve manually operated and adjustable by a set screw according to present invention.

Refering to FIG. 1, two-way manually adjustable valve 10 which is illustrated is adapted for control of fluid flow through valve body 19 from an inlet port 11 of bore 12 leading to a cavity 13 to an outlet port 15 via bore 14. Ports 11 and 15 and bore 12 and 14 are on the same center line constituting a straight through-flow passage for the fluid flow when valve is open.

Cavity 13 separating bores 12 and 14 is provided with a membrane 16, which in the illustrated case, conforms to the cavity contour due to the position of plug 17 as a result of a dog-point set screw 20 which is screwed in completely into stationary cover 18 provided with threads 20a against the membrane until openings 12a and 14a of bores 12 and 14 respectfully, are sealed off closing off the fluid flow and rendering the NORMALLY Closed Valve condition. By unscrewing dog-point set screw 20 from the position shown the pressure of the fluid in bores 12 and 14 and in the cavity 13 forces the membrane away from the cavity contour and against the retracting plug 17 until the valve passages become fully open to cavity 13 establishing a straight through unabstracted fluid flow and constituting the open position of the valve. If the valve were installed in the completely open position into a line, it would render a NORMALLY Open Valve condition.

Plug 17 is conical in construction and is slidably received in the valve cavity for membrane actuation when the set screw is turned in or out within cover 18 permitting flow control between the closed and open positions in accordance with applicational needs rendering a simple flow control capability within the maximum and minimum flow capacity ranges of the valve.

The stationary cover 18 is permanently secured to valve body 19 by screws (not shown) against ring 21 of the membrane, which may be provided with a wire ring, and elastic O-ring (not shown) or by reinforced construction through molding as in the illustrated case, providing a tight seal for valve operation at high pressures.

Valve body 19 is so constructed as to receive membrane 16 within appropriately machined valve proper 22 accomodating suitably other components for easy valve assembly and maintenance while installed and insuring field servicing without valve removal.

Figure 2:
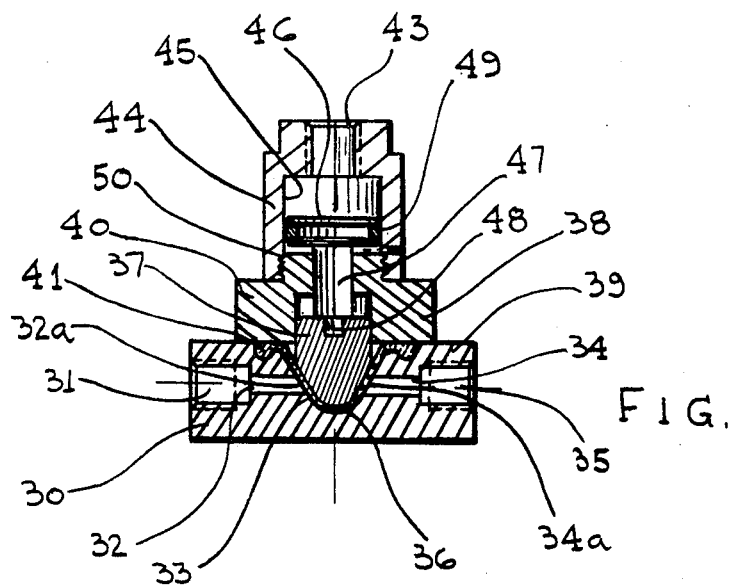
FIG. 2 is a sectional view of a pilot operated membrane valve of this invention.

A somewhat modified form of the present invention is shown in FIG. 2 wherein a two-way pilot operated valve 30 is illustrated having valve body 39 identical in construction with valve body 19 in FIG. 1, and a plug 37-the same as plug 17. The primary difference in the FIG. 2 embodiment is in the provision of a pilot piston assembly 40 that has an effective piston area for pilot pressure actuation greater than the effective membrane area in contact with the fluid valved. The significance of this is that pilot pressures at pilot port 43 may be less than the pressure supplied to inlet port 31, outlet port 35 and most important, less than the pressure existing in cavity 33 separating bores 32 and 34 and housing membrane 36.

More specifically, pilot inlet port 43 is formed in a pilot cap 44 having an enlarged central bore 45 slidably receiving a piston 46. Piston 46 is provided with an integral piston rod 47 terminating with a dog point 48 which in the illustrated case enters plug 37 for membrane actuation to either close or open valve passages for control of the fluid flow through the valve.

Upon the application of pilot pressure to port 43, piston 46 provided with seals 49 will be forced downward pressing plug 37 against the membrane until the fluid valved is expelled from cavity 33 and until port openings 32a and 34a become completely shut by the membrane rendering the valve closed.

When pilot pressure is removed from port 43, the pressure of the fluid valved at port openings 32a and 34a will enter cavity 33 and force the plug and the piston to retract as a result of fluid pressure action upon the membrane in contact with such plug, ultimately rendering the valve completely open. Thus the pilot operated valve will be a two-position valve with provisions to operate either as a normally open, or as a normally closed valve, depending upon the application.

Stationary cover 38 is permanently secured to valve body 39 by screw (not shown) against ring 41 of membrane 36 and is provided with a threaded hub 50 to receive pilot cap 44 in the final assembly. The overall assembly accomodates suitably other components for easy valve assembly and maintenance while installed, insuring field servicing without valve removal.

It should be noted that this valve when provided with check valves in inlet and outlet ports leading to the valve cavity can also act as a positive displacement pump displacing the fluid in the cavity upon each actuation of the pilot, and providing simple means for pumping highly corrosive media.

While I have illustrated and described what I now contemplate to be the best mode of carrying out my invention, the construction is, of course, subject to modification without departing from the spirit and scope of my invention. Therefore, I do not wish to restrict myself to the particular form of construction illustrated and described, but desire to avail myself of all modifications that may fail within the scope of the appended claims.

What is claimed is:

1. A directional fluid valve for control of fluid flow from a source to a receiver comprising: a housing means, first port means in said housing means receiving fluid under pressure, second port means in said housing means to be connected to the receiver and constituting valve exhaust means, the first and second porting means being essentially in line with each other for a straight-through fluid flow, a cavity perpendicular to said port means and essentially midway between the first and second ports of said housing means, said cavity being circular in shape at the entrance into said housing means and conical at the bottom blind end, cross openings on the incline of said conical cavity end directly opposite to each other constituting entrance and exit means for said first and second porting means, said circular entrance being partway counter- bored and trepanned for receiving and holding a membrane reinforcing ring in final assembly, a valving means in said housing adjustable slidably in said cavity from a first position blocking communication between said first and second port means to a second position communicating said first and second port means, said valving means comprising a membrane for sealing off said cross openings on the incline of said conical cavity portion of said housing means, said membrane being provided with a reinforcing ring for entering into the trepanned counterbore of said housing means and sealing the cavity, a valve actuator means capable of shifting said membrane from one of said positions for valve closing to the other of said positions for valve opening, said actuator incorporating an actuating plug for contact with said membrane and that is conical in shape on one end that is received in the conical blind end of the housing cavity while the other end is cylindrical, said cylindrical end having a central recess for accommodating a dog point of an operator means, said actuating plug being slidably received in said cavity of the valve housing means while the cylindrical end is exposed to the outside, a housing cover means, including a centrally located counterbore of size equivalent to the size of cylindrical portion of said actuating plug, said counterbore terminating with a small opening leading to the outside of said cover means and serving the purpose of receiving valve operator means, said actuating plug being slidably received in said counterbore and acting as a pilot guide for subsequent motion of said actuating plug during the operation of the valve by means of an operator, a pilot operator for shifting said actuating plug and actuating said membrane for valve closing or valve opening two position operation, said pilot operator comprising a pilot cap having an enlarged central bore for receiving a piston of the piston-rod assembly and terminating with threads for an easy attachment to the said housing cover means by way of a threaded boss provided therein, and a central pilot port directly opposite to said enlarged central opening for supply and exhaust of the pilot working fluid, a piston-rod assembly wherein the piston having an integrally mounted piston rod terminating with a dog point is slidably positioned inside said pilot cap so as to have the piston rod slidably enter said small opening at the end of said counterbore of the housing cover means and continue until said dog point bottoms in said central recess of the actuating plug, an appropriate piston seal and an air vent in said pilot cap for escape of atmospheric air during piston downward motion, said pilot piston being sized so that when the pilot is energized by air or hydraulic pressure, such pressure on the pilot piston is never greater than the pressure at the actuating plug in contact with the membrane which controls the fluid valving.

\* \* \* \* \*